Aug. 8, 1950 W. D. HOUGHTON 2,518,013

TIME DIVISION MULTIPLEX SYSTEM

Filed July 16, 1947 3 Sheets-Sheet 1

INVENTOR.
William D. Houghton
BY Harry Tunick
ATTORNEY

Aug. 8, 1950 W. D. HOUGHTON 2,518,013

TIME DIVISION MULTIPLEX SYSTEM

Filed July 16, 1947 3 Sheets-Sheet 2

INVENTOR.
William D. Houghton
BY Harry Tunick
ATTORNEY

Aug. 8, 1950 W. D. HOUGHTON 2,518,013

TIME DIVISION MULTIPLEX SYSTEM

Filed July 16, 1947 3 Sheets-Sheet 3

INVENTOR.
William D. Houghton
BY Harry Tunick
ATTORNEY

UNITED STATES PATENT OFFICE 2,518,013

TIME DIVISION MULTIPLEX SYSTEM

William D. Houghton, Port Jefferson, N. Y., assignor to Radio Corporation of America, a corporation of Delaware Application July 16, 1947, Serial No. 761,275

18 Claims. (Cl. 332—9)

This invention relates to time division multiplex systems, and more particularly to such systems wherein the different channel units produce amplitude modulated pulses.

As is known, a time division multiplex system is one in which the common output circuit is allotted sequentially to a plurality of channel units for non-overlapping time intervals. One such system mentioned by way of example only, and which describes numerous features mentioned hereinafter in connection with the present invention is described in my copending application Serial No. 608,957, filed August 4, 1945. In this copending application, the timing (occurrence time) of the pulses is modulated rather than the amplitude.

A general object of the present invention is to provide an improved multi-channel time division multiplex system in which the pulses from the different channels are amplitude modulated by different programs or message waves.

A more specific object of the invention is to enable channel selection, pulse production and modulation to be effected in a circuit employing a single vacuum tube.

Another object is to provide an improved multichannel time division system utilizing a step voltage wave distributor for controlling the different channel units to produce amplitude modulated waves.

Figures 1, 6:
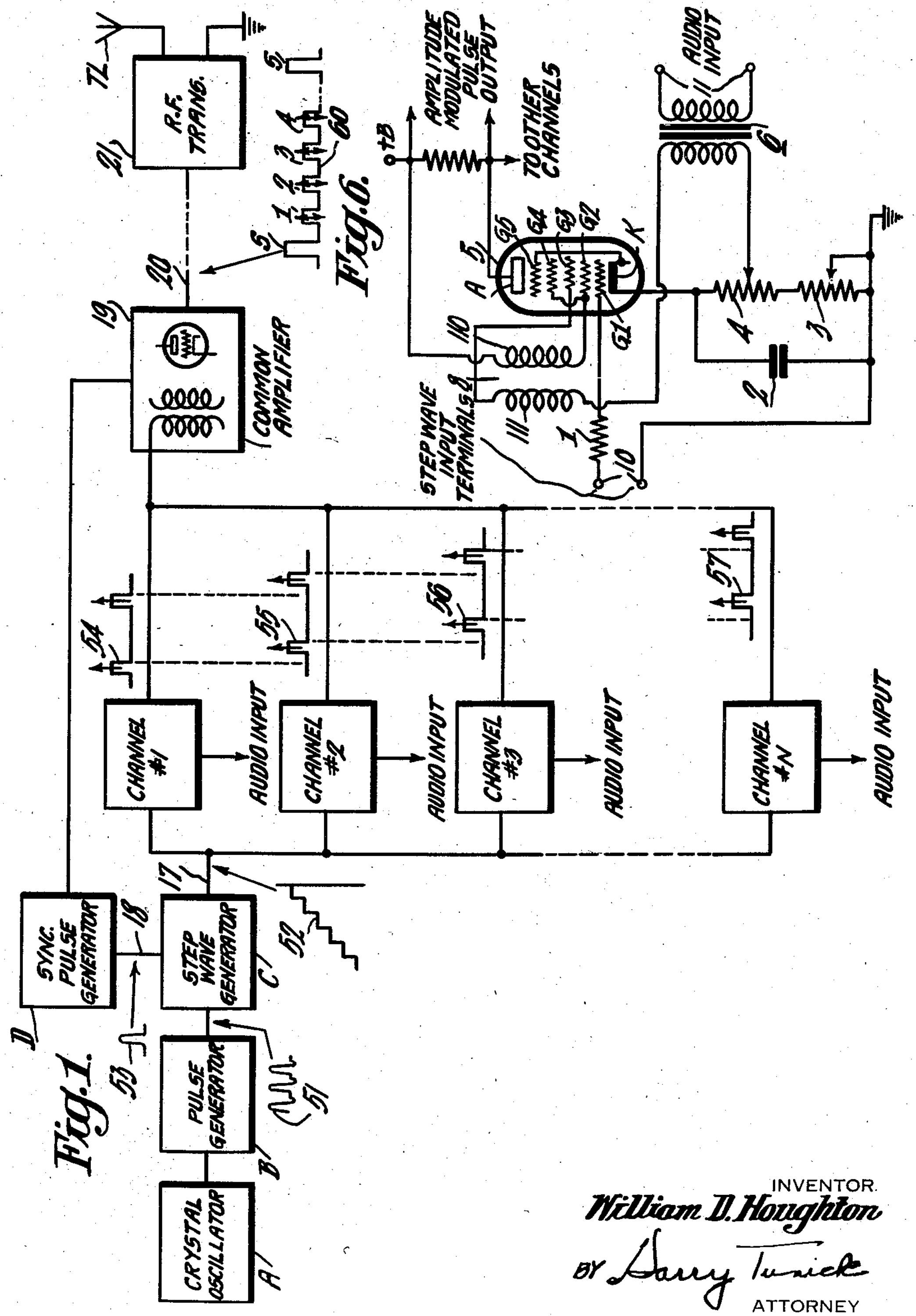
Figure 2:
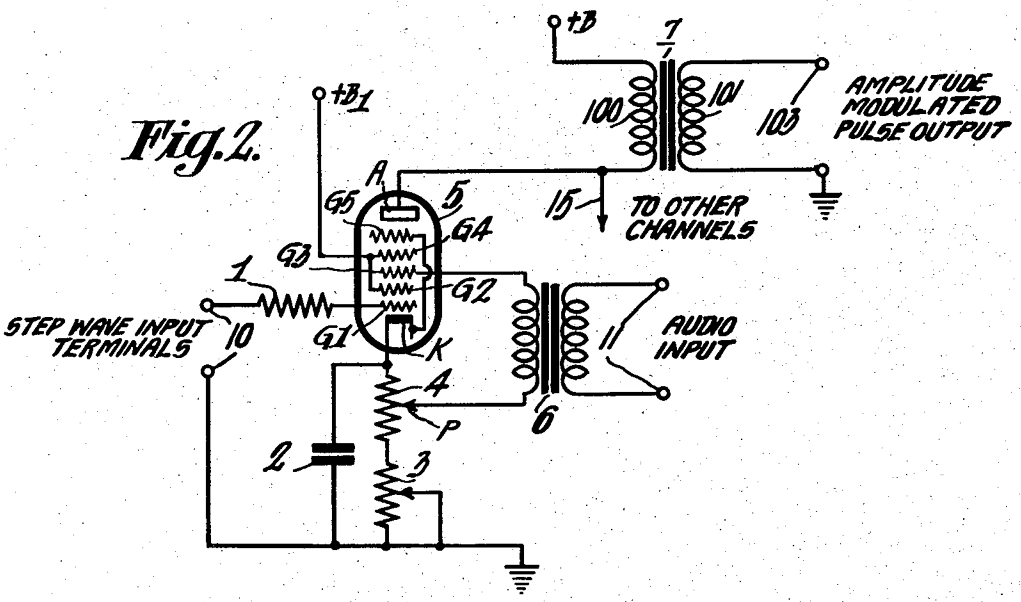
Figures 3A, 3B, 3C, 3D, 3E:
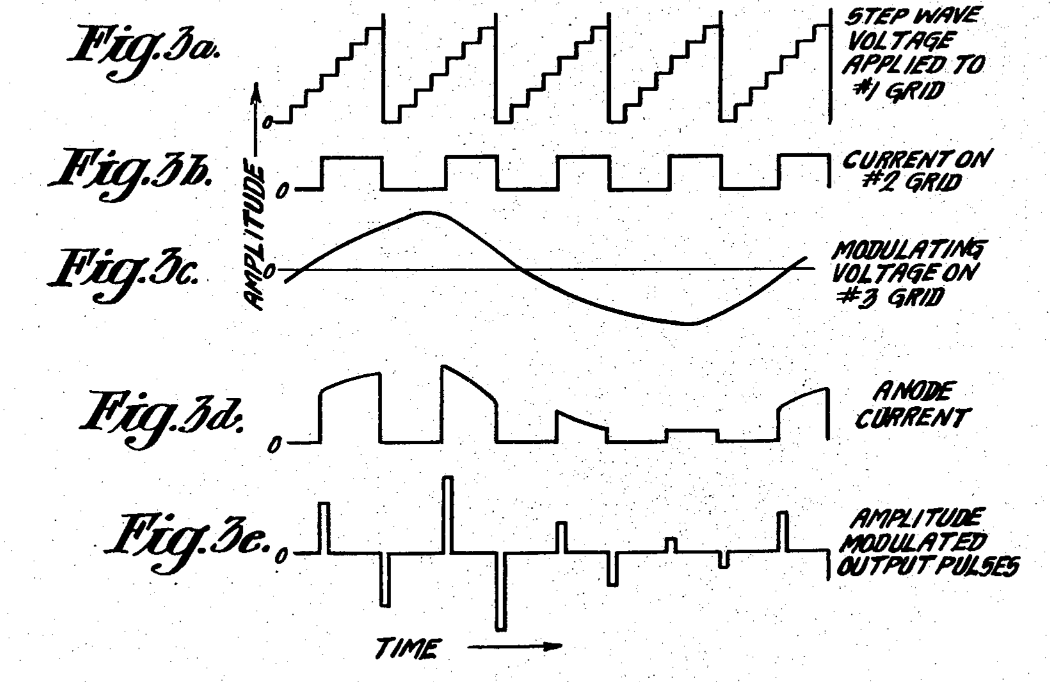
Figure 4:
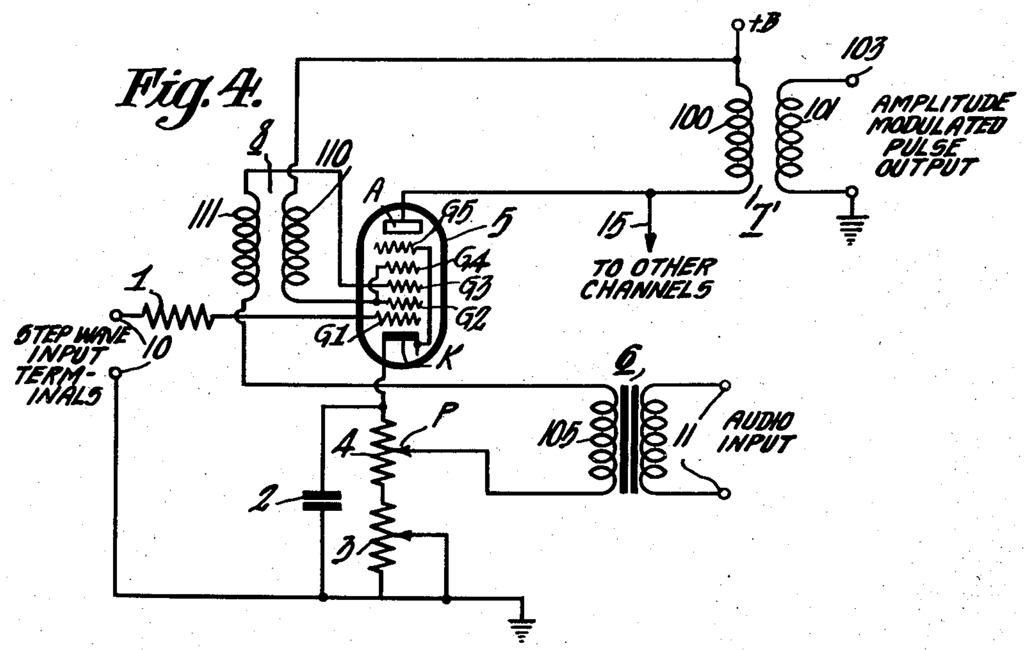

A more detailed description of the invention follows in conjunction with a drawing, wherein:

Fig. 1 illustrate, diagrammatically in box form, a complete transmitting system for a pulse type time division multiplex system in which the invention may be employed;

Figs. 2, 4 and 6 show three different embodiments of the combined selector and modulator circuit which constitutes the invention. Each of these embodiments may be considered a channel unit; and Figs. 3*a* to 3*e* and 5*a* to 5*e* are curves given in explanation of the operation of the circuits of Figs. 2 and 4, respectively.

Referring to Fig. 1, there is shown a transmitting terminal of a time division multiplex system having a crystal oscillator A which locks in a pulse generator B, in turn, feeding a step voltage wave generator C. The step voltage wave generator C has two outputs, one of which has a step voltage wave having a plurality of risers which is supplied to the inputs of a plurality of channel units, 1, 2, 3—N, in parallel relation over a lead 17. The other output from the step voltage wave generator C is a pulse occurring on the discharge or termination of the step voltage wave and which is led over lead 18 to a synchronizing pulse generator D. The output synchronizing pulses from D and the amplitude modulated pulses from the channel units are fed to a common amplifier circuit 19 which, in turn, feeds the combined pulses over lead 20 to a radio frequency transmitter 21 whose output is fed to a suitable wave directive structure such as an antenna TL.

The crystal oscillator A produces short duration pulses of current which feed into and lock by injection the pulse generator B. The pulse generator B may be of the blocking oscillator type and produces short output pulses represented by the waveform 51 which are applied to the step wave generator C. The resulting step voltage wave from the step wave generator C is represented by waveform 52, while the discharge pulse used for controlling the synchronizing pulse generator D is represented by the waveform 53. It will be noted that the step voltage wave 52 produced by the step wave generator comprises a plurality of steps or risers of different voltage values. Stated otherwise, the different risers in the step voltage wave 52 have different voltage values relative to a base line, but these risers preferably have the same or equal amplitude range.

For a more detailed description of the type of circuits which may be used for the crystal oscillator A, the pulse generator B, the step wave generator C and the synchronizing pulse generator D, reference is made to my copending application Serial No. 608,957, supra.

The different channel units 1, 2, 3, etc., each comprise a circuit of the type shown in Figs. 2 or 4, preferably that shown in Fig. 2. The different channel units are differently biased to become effective or operative on different risers of the step voltage wave 52. Each channel unit is provided with means for producing pulses therein and for modulating the amplitude of these pulses with a modulation signal. The different channel units are supplied with different modulating signals or audio input waves. It will thus be seen that the output from the different channels as indicated by waveforms 54, 55, 56 and 57 (Fig. 1) occur at different time intervals, and that for each cycle of operations or frame represented by the duration of a single complete step voltage wave, there will be a pulse from each channel unit and these channel pulses occur sequentially. Of course, each frame will also include a synchronizing pulse which occurs at the end of the step voltage wave, or after all of the channels have each produced one pulse. It is preferred that the synchronizing pulse be of longer duration than any of the channel pulses and of an amplitude equal to or slightly greater than the maximum amplitude of any channel pulse under extremes of modulation. Of course, the synchronizing pulse may be lower in amplitude if the receiving equipment is designed to accept it. Also, the synchronizing signal may be two or more closely spaced pulses (spaced more closely than any two channel pulses) if desired.

The synchronizing pulse and the channel pulses as they appear in the output of the common amplifier 19 is represented by waveform 60. Thus each frame or cycle of operations will include a synchronizing pulse and a plurality of channel pulses, one for each channel, suitably spaced apart and occurring sequentially. The arrows on the channel pulses 1, 2, 3, 4—N of waveform 60 indicate that the amplitudes of the channel pulses vary in accordance with the modulation. The synchronizing pulse in waveform 60 is indicated by reference letter S.

The radio frequency transmitter 21 may be any suitable radio frequency oscillator which is modulated by the pulses supplied thereto. It is preferred that this transmitter be a frequency modulation transmitter whose frequency is modulated in accordance with the amplitude of the pulses in lead 20. If desired, the amplitude of the carrier waves produced by the transmitter 21 may, as an alternative, be modulated in accordance with the amplitude of the pulses in lead 20.

Referring to Fig. 2 which shows one of the channel units in the multiplex system of Fig. 1, there is shown a pentagrid vacuum tube 5 having a cathode K, a first grid G1, a second grid G2, a third grid G3, a fourth grid G4 and a fifth or suppressor grid G5. The cathode is directly connected to the suppressor grid. The cathode K and the first and second grids, G1 and G2, may be considered as one section of the tube, while grids G3, G4, G5 and anode A may be considered as the second section of the tube. The step wave input from the step voltage wave generator C is applied to terminals 10, one of which is in circuit with the cathode K and the other of which is connected to the first grid G1 through a current limiting resistor 1. The first section of the tube 5 can be considered as the selector section and is biased to cut-off by means of resistor 4 and the cathode bias potentiometer 3 arranged in series between the cathode and ground. The condenser 2 is used to bypass the alternating current components of cathode current. The cut-off bias is arranged so that for a particular channel, current will flow through the tube 5 on a particular riser of the applied step voltage wave. It should be understood of course that for the different channels the different tubes 5 will be differently biased to become conductive on different risers of the applied common step voltage input wave. The amplitude of each step riser in the step voltage wave is made large compared to the cut-off potential of grid G1 so that for that particular riser one of the channel units will conduct. The resistor 1 limits the maximum G1 grid-to-cathode potential to zero due to current flowing in the resistor; hence, the G1 grid-to-cathode potential rises from below cut-off to zero on a desired step riser, and remains zero until the end of the step voltage wave. The current in the first section of tube 5 rises from zero to maximum on a desired step riser and remains at maximum until the end of the step wave signal.

By way of illustration only, the amplitude of voltage range of each riser in the applied step voltage wave may be 15 volts which is a value larger than the potential required to drive the grid G1 from cut-off to zero. This grid-to-cathode potential may be of the order of 5 to 10 volts.

Grid G3 controls electrons passing therethrough to the anode. Hence the first section of tube 5 can be considered as a channel position selector, while the second section of the tube 5 can be considered as the modulation stage controlled by the modulating signal which is applied between grid G3 and the cathode by means of audio transformer 6. The audio input is applied to the primary winding of audio coupling transformer 6 from terminals 11. Resistor 4 is used as a potentiometer in adjusting the bias on grid G3, as a result of which the modulator section of tube 5 can be made to operate on the linear portion of its G3 grid voltage-anode current characteristic; that is, as a class A amplifier. It will thus be seen that the cut-off bias on the first or selector section of the tube 5 is determined by the adjustment on potentiometer 3 and the value of resistor 4, while resistor 4 is also used as a potentiometer for adjusting the bias on grid G3. With no audio voltage present on terminals 11, the grid G3 is biased to any desired potential by means of potentiometer 4, preferably as a class A amplifier. When the first section of tube 5 conducts, current flows to the second section and the amplitude of the current flow in the second section is determined by the G3 grid-to-cathode potential.

The anode A of tube 5 is connected through one winding of differentiating transformer 7 to the positive terminal +B of a source of unidirectional polarizing potential. The screen grids G2 and G4 are supplied with positive potential relative to the cathode by means of a connection to $+B_1$. It should be noted that the anode of tube A is connected to the anodes of the tubes 5 of the other channels by way of lead 15.

In the operation of the circuit of Fig. 2, the commencement of current flow in the second section of tube 5 causes a voltage pulse to be developed across the output winding 101 of the differentiating transformer 7. The amplitude of the voltage pulse across winding 101 is determined by the rate of change and magnitude of the anode current in the second section of tube 5 which, in turn, is determined by the G3 grid-to-cathode potential. Hence, by varying the grid G3 to cathode potential at an audio rate, the output pulses may be made to vary in amplitude at an audio rate.

A better understanding of the operation of the channel unit of Fig. 2 may be had by referring to curves Fig. 3*a* to 3*e*. Fig. 3*a* shows by way of illustration, a step voltage wave which is supplied to the input terminals 10 and consequently to the grid G1 of tube 5. Fig. 3*b* shows the current in the gird G2 circuit of the tube 5 with the assumption that the cathode bias of tube 5 is so set that it will become conducting on the third riser of the applied step voltage wave Fig. 3*a*. It should be noted that once the tube 5 starts to conduct, it continues to conduct until the end of the stair or step voltage wave. Fig. 3*c* shows the modulating voltage waveform applied to grid G3. Fig. 3*d* shows the anode current in the second section of tube 5; that is, the current flowing to the anode A. It should be noted that the amplitude of the current pulses in Fig. 3*d* varies in accordance with the variation of the modulating wave of Fig. 3*c*.

Fig. 3e shows the differentiated output pulses as they appear between terminal 103 and ground. Winding 101 of transformer 7 is so poled that the pulses developed by the leading or rising edge of the waveform 3b cause positive pulses to be developed between terminal 103 and ground. That is, when current starts to flow in tube 5 due to the amplitude of the applied step wave exceeding the bias potential on grid G1, a positive pulse is developed on terminal 103. The amplitude of this pulse is a function of the rate of change in the anode current of tube 5. By varying the voltage on grid G3 of tube 5 at an audio rate, the rate of change of anode current may be varied at an audio rate resulting in the amplitude of the pulse developed at terminal 103 being varied at an audio rate. When tube V5 cuts off at the end of the applied step wave, a negative pulse is developed which also varies at an audio rate but since all channels cease conducting simultaneously at the end of the applied step wave, all channels produce negative pulses at the same time; hence these negative pulses thus developed are not usable in the utilization circuits and are discarded.

In the system so far described, one channel will start conducting on each riser of the applied step voltage wave and will continue to conduct until the end of the step voltage wave. Different channels start conducting on different step risers. At the end of the step voltage wave, all tubes 5 of all channels will cease conducting. An output pulse is developed for each channel at the time that particular channel starts conducting. The amplitude of the generated pulse is a function of the audio voltage applied to that particular channel. Inasmuch as transformer 7 is a differentiating transformer which has a low reactance for audio frequencies, it will be seen that voltage pulses occur only at the time the rate of change of current in winding 100 is high; that is, at the time when a channel starts conduction or at the time when conduction ceases. Since the rate of change of current in winding 100 varies slowly (at an audio rate) during the conducting time of a channel no voltage change will be present across winding 101. From the foregoing it will be apparent that I have been able to provide a channel unit employing a single tube used both as a channel position selector and as a modulator tube. The modulator section of tube 5 of Fig. 2 carries current for the same length of time as the selector section of the same tube.

Fig. 4 shows a modified form of channel selector circuit in which the modulator section of tube 5 carries current for only a short interval of time compared to the interval during which the selector section of tube 5 carries current. The same reference numerals are used in both Figs. 2 and 4 to designate the same parts. Essentially, Fig. 4 differs from Fig. 2 in employing a differentiating transformer 8, one winding of which is employed between source +B and the screen grids while the other winding is coupled between grid G3 and the secondary winding 105 of the audio transformer 6. When the selector or first section of the tube 5 starts to conduct upon a particular riser of the applied step voltage wave, current will flow through the primary winding 110 of the differentiating transformer 8 as a result of which a voltage pulse is produced across the secondary winding 111 of transformer 8 and is applied as a positive pulse to grid G3. The windings of transformer 8 are so poled that the pulses applied to grid G3 due to current starting to flow in winding 110 causes the second or modulator section of tube 5 to conduct solely for the duration of the pulses produced in differentiating transformer 8. The duration of these pulses is a function of the characteristics of differentiating transformer 8.

The peak voltage of the pulse developed across the secondary winding 111 of transformer 8 of Fig. 4 is sufficient to drive grid G3 from below cut-off to the middle of its linear operating characteristic. This is because grid G3 of tube 5 in Fig. 4 is selectively biased below cut-off by means of the tap on potentiometer 4. At the end of this pulse, current in the modulator ceases despite the fact that current will continue to flow in the first section of tube 5.

The audio voltage developed across the secondary winding of transformer 6 of Fig. 4 varies the amplitude of the pulse current in the second or modulator section of tube 5 linearly in accordance with the modulating signal. However, the amplitude of the audio voltage across transformer 6 is insufficient to cause current to flow in the second section of tube 5 in the absence of pulses from differentiating transformer 8. The anode current of tube 5 thus produces a pulse across the primary winding of output pulse transformer 7' which is amplitude modulated in accordance with the modulating signal.

Figures 5A, 5B, 5C, 5D, 5E:
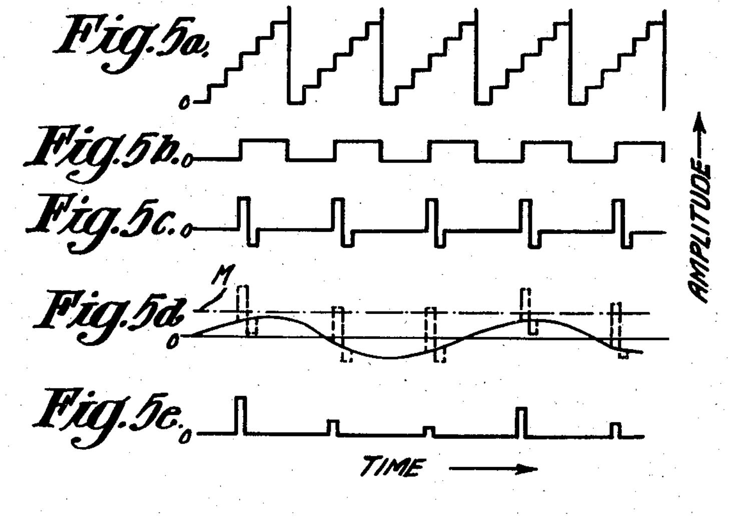

The operation of Fig. 4 is graphically explained in the curves of Fig. 5a to 5e inclusive. Fig. 5a shows the step voltage wave applied to the input terminals 10 of the tube 5. Fig. 5b shows the waveform of the current in the first or selector section of tube 5, assuming that the cathode bias is so set that this section becomes conductive on the third riser of the applied step voltage wave. Fig. 5c shows the waveform of the differentiated pulses applied to grid G3. The combined pulses, shown dotted, plus the sinuous audio voltage wave, shown by the solid line, applied to grid G3 is shown in the curve of Fig. 5d. The horizontal dot-dash line M in Fig. 5d indicates the cut-off potential of the second section of tube 5. The pulses of curve 5e represents amplitude modulated pulses appearing at the output terminal 103 of the channel unit of Fig. 4.

In summation, the operation of the system of Fig. 4 may be given as follows:

When the amplitude of the applied step wave exceeds the bias potential on grid G1 of tube 5, electron current starts to flow from the cathode K to grid G2 and through winding 110 of transformer 8 to +B. Since the current in the first section of tube 5 rises from zero to a maximum on one riser of the applied step wave, the rate of change of current is very high and as a result of which a pulse is developed across winding 111 of differentiating transformer 8. The duration of the pulse thus developed is a function of the characteristics of transformer 8 and is made shorter than the time between successive risers of the step wave. This is necessary since each riser causes one channel to produce a pulse and the pulse from one channel must cease before a pulse from another channel is generated.

The bias on grid G3 is set at a value which prevents current flow in the absence of a pulse on winding 111 of transformer 8. However, when a pulse is present on transformer 8 the second section of tube 5 operates as a class A amplifier for the duration of the pulse. That is, during the time interval occupied by the peak of the pulse developed across winding 111, the second section of tube 5 (modulator section) is operating on the linear portion of its anode-current grid-voltage characteristic. The amplitude of the voltage on the grid at the time of the pulse is varied at an audio rate by means of audio transformer 6 which is connected in series with winding 111 of differentiating transformer 8 between grid G3 and tap P on potentiometer 4. Stated in other words, the voltage pulse developed across winding 111 of differentiating transformer 8 is added to the sine wave voltage developed across winding 105 of audio transformer 6 and causes the anode current of tube 5 to vary in a linear fashion, during the pulse time, with the applied audio modulating signal. In the absence of a pulse on winding 111, the bias on grid G3 is of such a value that current will not flow even though the modulating signal is still present on transformer 6. The output pulse type transformer 7' may be replaced with any suitable impedance since only one channel at a time is carrying current. In cases where a large number of channels are involved it may be more desirable to replace transformer 7 with a resistance, in which case the output will be negative amplitude modulated pulses. In this case, the circuits coupled to the output terminals will be so arranged as to utilize these negative pulses.

At the end of the applied step wave, when current ceases to flow in the first or selector portion of tube 5, a negative pulse is developed across winding 111 of differentiating transformer 8 but since the second or modulator section is already cut off this produces no effect in the output or anode circuit.

The advantage of the circuit of Fig. 4 over that of Fig. 2 resides in the lower amount of cross-talk between channels, inasmuch as the second section of tube 5 of Fig. 4 carries current only when transmitting a pulse and remains cut-off for all intervals between pulses.

Inasmuch as current flows to the anode of tube 5 in Fig. 4 only for the duration of the positive pulse applied to grid G3 by the differentiator circuit 8, the transformer 7 may be replaced by a resistor if desired. This will result in negative pulses developed in the anode circuit the amplitude of which will be a function of the audio modulating signal. In this case, the circuits coupled to the output terminals will be so arranged as to utilize these negative pulses. One such arrangement is shown in Fig. 6 and is preferred because it produces less cross-talk between channels than the system of Fig. 4 when the number of channels begins to be appreciable.

The term "ground" used herein is not limited to an actual earth connection but is deemed to be a point of reference potential which may be any point of zero alternating current potential.

What is claimed is:

1. The method of producing an amplitude modulated pulse which includes the steps of generating a discrete voltage wave, causing a space flow of charged particles when said voltage wave reaches a predetermined value for the remaining duration of said voltage wave, utilizing said space flow of charged particles to produce a voltage pulse of a duration shorter than the duration of said space flow of particles, applying said voltage pulse to said space flow of charged particles, and superimposing a modulating voltage on said votlage pulse.

2. The method of producing amplitude modulated pulses which includes the steps of generating recurring voltage waves, causing a space flow of current whenever each of said waves reaches a predetermined value for the remaining duration of that wave, utilizing said current to produce a voltage pulse for an interval of time shorter than said remaining duration and occurring at the start of said current flow, applying said voltage pulse in such sense and at such a location as to cause said flow of current to pass the point of application of said voltage pulse, and superimposing a modulating voltage wave on said voltage pulses.

3. The method of producing an amplitude modulated pulse which includes the step of generating a discrete voltage wave, causing a space flow of charged particles whenever said wave reaches a predetermined value for the remaining duration of said wave, utilizing said space flow of charged particles to produce a voltage pulse of a duration shorter than said remaining duration, applying said voltage pulse in such sense and at such a location as to cause said flow of particles to pass the point of application of said voltage pulse, and superimposing a modulating voltage on said voltage pulse of a value which of itself is insufficient to cause the charged particles to pass said point of application in the absence of said voltage pulse.

4. A pulse generating circuit comprising a vacuum tube normally biased to cut-off and having first and second sections through which electrons emanating from the cathode of said tube are adapted to flow in succession, means for applying a voltage wave to said first section of a sense and value sufficient to overcome the cut-off bias and cause electrons to flow in said first section, a pulse producing circuit coupled to said second section of said tube and responsive to the leading edge of the current flow therethrough for producing a voltage pulse, and means for applying a modulating voltage to said second section for varying the amount of current passing therethrough.

5. A pulse generating system including a tube having a cathode, first, second, third and fourth grids, a pair of resistors arranged in series between said cathode and ground and having such values as to normally bias said tube to cut-off, a condenser in shunt to said resistors for bypassing alternating components in said cathode circuit, at least one of said resistors being adjustable, a circuit coupled between said first grid and ground for applying a voltage wave of a value sufficient to overcome said cut-off bias and cause electron current to flow through said first and second grids, and a source of modulating voltage coupled between said third grid and a point on said other resistor.

6. A pulse generating system including a tube having a cathode, first, second, third and fourth grids, a pair of resistors arranged in series between said cathode and ground and having such values as to normally bias said tube to cut-off, a condenser in shunt to said resistors for bypassing alternating components in said cathode circuit, at least one of said resistors being adjustable, a circuit coupled between said first grid and ground for applying a voltage wave of a value sufficient to overcome said cut-off bias and cause electron current to flow through said first and second grids, and a source of modulating voltage coupled between said third grid and a tapping point on said other resistor, said last resistor comprising a potentiometer for adjusting the value of the potential between the third grid and said cathode.

7. A pulse generating system including a tube having a cathode, first, second, third and fourth grids, a pair of resistors arranged in series between said cathode and ground and having such values as to normally bias said tube to cut-off, a condenser in shunt to said resistors for bypassing alternating components in said cathode circuit, at least one of said resistors being adjustable, a circuit coupled between said first grid and ground for applying a voltage wave of a value sufficient to overcome said cut-off bias and cause electron current to flow through said first and second grids, a current limiting resistor connected to said first grid, and a source of audio modulating voltage coupled between said third grid and an adjustable tapping point on said other resistor.

8. A pulse generating system including a pentagrid tube having a cathode, first, second, third, fourth and fifth grids, and an anode, a direct connection between said second and fourth grids for shielding said third grid, a direct connection from said cathode to said fifth grid, means for supplying said anode and said shielding grids with positive potentials relative to said cathode, a pair of serially arranged resistors in said cathode circuit of a value which normally bias said tube to cut-off, means for applying a voltage wave to said first grid of a value which overcomes said cut-off bias and causes electrons to flow in said tube, an audio modulating circuit coupled between said third grid and a point on one of said resistors, and a pulse utilization circuit coupled to said anode.

9. A pulse generating system including a pentagrid tube having a cathode, first, second, third, fourth and fifth grids, and an anode, a direct connection between said second and fourth grids for shielding said third grid, a direct connection from said cathode to said fifth grid, means for supplying said anode and said shielding grids with positive potentials relative to said cathode, a pair of serially arranged resistors in said cathode circuit of a value which normally bias said tube to cut-off, means for applying a voltage wave to said first grid of a value which overcomes said cut-off bias and causes electrons to flow in said tube, an audio modulating circuit coupled between said third grid an adjustable tap on one of said resistors, said one resistor comprising a potentiometer, a condenser in shunt to said pair of serially arranged resistors, a current limiting resistor coupled to said first grid, and a pulse utilization circuit coupled to said anode.

10. A pulse generating system including a pentagrid tube having a cathode, first, second, third, fourth and fifth grids, and an anode, a direct connection between said second and fourth grids for shielding said third grid, a direct connection from said cathode to said fifth grid, means for supplying said anode and said shielding grids with positive potentials relative to said cathode, a pair of serially arranged resistors in said cathode circuit of a value which normally bias said tube to cut-off, means for applying a voltage wave to said first grid of a value which overcomes said cut-off bias and causes electrons to flow in said tube, an audio modulating circuit coupled between said third grid and an adjustable tap on one of said resistors, said one resistor comprising a potentiometer, a condenser in shunt to said pair of serially arranged resistors, a current limiting resistor coupled to said first grid, and a differentiating transformer having a primary winding coupled to said anode and a secondary winding adapted to be coupled to a utilization circuit.

11. A pulse generating system including a pentagrid tube having a cathode, first, second, third, fourth and fifth grids, and an anode, a direct connection between said second and fourth grids for shielding said third grid, a direct connection from said cathode to said fifth grid, a pair of serially arranged resistors in said cathode circuit of a value which normally bias said tube to cut-off, a differentiating circuit comprising a pair of coupled coils one of which is connected between said shielding grids and the positive terminal of a source of unidirectional potential and the other of which is connected between said third grid and a tapping point on one of said resistors, a circuit for supplying modulating voltage coupled between said other coil and said tapping point, means for applying a voltage wave to said first grid of a value sufficient to overcome the cut-off bias and cause electrons to flow in said tube, said coupled coils being so poled that the flow of current through said tube causes a voltage pulse to be applied to said third grid of such sense and value as to enable electron current to flow to said anode solely for the duration of said pulse, the value of said modulating voltage being such that it is insufficient to cause electrons to flow to said anode in the absence of said pulse on said third grid.

12. A pulse generating system including a pentagrid tube having a cathode, first, second, third, fourth and fifth grids, and an anode, a direct connection between said second and fourth grids for shielding said third grid, a direct connection from said cathode to said fifth grid, a pair of serially arranged resistors in said cathode circuit of a value which normally bias said tube to cut-off, a differentiating circuit comprising a pair of coupled coils one of which is connected between said shielding grids and the positive terminal of a source of unidirectional potential and the other of which is connected between said third grid and a tapping point on one of said resistors, a circuit for supplying modulating voltage coupled between said other coil and said tapping point, means for applying a voltage wave to said first grid of a value sufficient to overcome the cut-off bias and cause electrons to flow in said tube, said coupled coils being so poled that the flow of current through said tube causes a voltage pulse to be applied to said third grid of such sense and value as to enable electron current to flow to said anode solely for the duration of said pulse, the value of said modulating voltage being such that it is insufficient to cause electrons to flow to said anode in the absence of said pulse on said third grid, a resistor in said anode circuit, and a utilization circuit coupled across said resistor.

13. A pulse generating system including a pentagrid tube having a cathode, first, second, third, fourth and fifth grids, and an anode, a direct connection between said second and fourth grid for shielding said third grid, a direct connection from said cathode to said fifth grid, a pair of serially arranged resistors in said cathode circuit of a value which normally bias said tube to cut-off, a differentiating circuit comprising a pair of coupled coils one of which is connected between said shielding grids and the positive terminal of a source of unidirectional potential and the other of which is connected between said third grid and a tapping point on one of said resistors, a circuit for supplying modulating voltage coupled between said other coil and said tapping point, means for applying a voltage wave to said first grid of a value sufficient to overcome the cut-off bias and cause electrons to flow in said tube, said coupled coils being so poled that the flow of current through said tube causes a voltage pulse to be applied to said third grid of such sense and value as to enable electron current to flow to said anode solely for the duration of said pulse, the value of said modulating voltage being such that is insufficient to cause electrons to flow to said anode in the absence of said pulse on said third grid, a differentiating transformer having a primary winding in said anode circuit and a secondary winding coupled to a utilization circuit.

14. A pulse generating system including a pentagrid tube having a cathode, first, second, third, fourth and fifth grids, and an anode, a direct connection between said second and fourth grids for shielding said third grid, a direct connection from said cathode to said fifth grid, a pair of serially arranged resistors in said cathode circuit of a value which normally bias said tube to cut-off, a differentiating circuit comprising a pair of coupled coils one of which is connected between said shielding grids and the positive terminal of a source of unidirectional potential and the other of which is connected between said third grid and a tapping point on one of said resistors, a circuit for supplying modulating voltage coupled between said other coil and said tapping point, means for applying a voltage wave to said first grid of a value sufficient to overcome the cut-off bias and cause electrons to flow in said tube, said coupled coils being so poled that the flow of current through said tube causes a voltage pulse to be applied to said third grid of such sense and value as to enable electron current to flow to said anode solely for the duration of said pulse, a resistor in said anode circuit, and a utilization circuit coupled across said resistor for deriving pulses therefrom.

15. A time division pulse multiplex system having a transmitting terminal provided with a plurality of channel circuits, each channel circuit including pulse generating apparatus, a pentagrid tube having a cathode, first, second, third, fourth and fifth grids, and an anode, a direct connection between said second and fourth grids for shielding said third grid, a direct connection from said cathode to said fifth grid, means for supplying said anode and said shielding grids with positive potentials relative to said cathode, a pair of serially arranged resistors in said cathode circuit of a value which normally bias said tube to cut-off, means for applying a voltage wave to said first grid of a value which overcomes said cut-off bias and causes electrons to flow in said tube, an audio modulating circuit coupled between said third grid and a point on one of said resistors, and a pulse utilization circuit coupled to said anode, and D. C. connections between the anodes of all pentagrid tubes of all channels.

16. A pulse generating system including a tube having a cathode, first, second and third grids, a resistance circuit arranged in series between said cathode and ground and having such a value as to normally bias said tube to cut-off, a condenser in shunt to said resistance circuit for bypassing alternating components in said cathode circuit, a circuit coupled between said first grid and ground for applying a voltage wave of a value sufficient to overcome said cut-off bias and cause electron current to flow through said first and second grids, and a source of modulating voltage coupled to said third grid.

17. A pulse generating system including a pentagrid tube having a cathode, first, second, third, fourth and fifth grids, and an anode, a direct connection between said second and fourth grids for shielding said third grid, a direct connection from said cathode to said fifth grid, means for supplying said anode and said shielding grids with positive potentials relative to said cathode, a resistance circuit in series with said cathode and of a value which normally biases said tube to cut-off, means for applying a voltage wave to said first grid of a value which overcomes said cut-off bias and causes electrons to flow in said tube, an audio modulating circuit coupled between said third grid and an adjustable tap on said resistance circuit, a condenser in shunt to said resistance circuit, a current limiting resistor coupled to said first grid, and a differentiating transformer having a primary winding coupled to said anode and a secondary winding adapted to be coupled to a utilization circuit.

18. A time division pulse multiplex system having a transmitting terminal provided with a plurality of channel circuits, each channel circuit including, a pentagrid tube having a cathode, first, second, third, fourth and fifth grids, and an anode, a direct connection between said second and fourth grids for shielding said third grid, a direct connection from said cathode to said fifth grid, means for supplying said anode and said shielding grids with positive potentials relative to said cathode, a resistor network in said cathode circuit of a value which normally biases said tube to cut-off, means for applying a voltage wave to said first grid of a value which overcomes said cut-off bias and causes electrons to flow in said tube, an audio modulating circuit coupled between said third grid and a point on said resistor network, and a pulse utilization circuit coupled to said anode, and D. C. connections between the anodes of all pentagrid tubes of all channels.

WILLIAM D. HOUGHTON.

REFERENCES CITED

The following references are of record in the file of this patent:

UNITED STATES PATENTS

| Number | Name | Date |
|---|---|---|
| 1,672,215 | Heising | June 5, 1928 |
| 2,323,250 | Smith | June 29, 1943 |
| 2,413,440 | Farrington | Dec. 31, 1946 |